(12) United States Patent
Kuwabara et al.

(10) Patent No.: US 9,733,072 B2
(45) Date of Patent: Aug. 15, 2017

(54) THREE DIMENSIONAL MEASUREMENT APPARATUS, CONTROL METHOD THEREFOR, INFORMATION PROCESSING APPARATUS, CONTROL METHOD THEREFOR, AND NON-TRANSITORY COMPUTER-READABLE STORAGE MEDIUM

(71) Applicant: CANON KABUSHIKI KAISHA, Tokyo (JP)

(72) Inventors: Nobuaki Kuwabara, Yokohama (JP); Tetsuri Sonoda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 482 days.

(21) Appl. No.: 13/648,161

(22) Filed: Oct. 9, 2012

(65) Prior Publication Data
US 2013/0093881 A1    Apr. 18, 2013

(30) Foreign Application Priority Data
Oct. 17, 2011    (JP) .................................. 2011-228272

(51) Int. Cl.
*H04N 7/18*     (2006.01)
*G01B 11/25*    (2006.01)
*G06T 7/521*    (2017.01)

(52) U.S. Cl.
CPC .......... *G01B 11/2513* (2013.01); *G01B 11/25* (2013.01); *G01B 11/2509* (2013.01); *G06T 7/521* (2017.01)

(58) Field of Classification Search
CPC .............................. G01B 11/25; G06T 7/0057
(Continued)

(56) References Cited

U.S. PATENT DOCUMENTS 5,982,342 A * 11/1999 Iwata et al. ...................... 345/7
6,064,759 A *  5/2000 Buckley et al. ............. 382/154
(Continued)

FOREIGN PATENT DOCUMENTS

JP    2002-286432 A    10/2002
JP    2003-511762 A     3/2003
(Continued)

OTHER PUBLICATIONS

Japanese Office Action dated Sep. 4, 2015 in Japanese Application No. 2011-228272.

*Primary Examiner* — Tung Vo
*Assistant Examiner* — Zaihan Jiang
(74) *Attorney, Agent, or Firm* — Fitzpatrick, Cella, Harper & Scinto

(57) ABSTRACT

A three dimensional measurement apparatus comprising: a projection unit configured to project a pattern including a measurement pattern and a feature pattern onto an object; an image capturing unit configured to capture an image of the object onto which the pattern is projected; a grouping unit configured to divide the captured image into a plurality of regions using the measurement pattern in the pattern and a plurality of epipolar lines determined based on a positional relationship between the projection unit and the image capturing unit, thereby grouping predetermined regions among the plurality of divided regions; a feature recognition unit configured to recognize the feature pattern based on a difference in the feature pattern between the predetermined regions; and a three-dimensional shape calculation unit configured to calculate a three-dimensional shape of the object based on the feature pattern.

15 Claims, 12 Drawing Sheets

(58) Field of Classification Search
USPC .......................................... 348/135, E07.085
See application file for complete search history.

(56) References Cited

U.S. PATENT DOCUMENTS

| | | | |
|---|---|---|---|
| 6,606,788 B1* | 8/2003 | Morimoto et al. ............. 29/832 |
| 6,744,914 B1* | 6/2004 | Rubbert .................. A61C 7/00 |
| | | | 345/419 |
| 8,538,166 B2* | 9/2013 | Gordon ................. G01B 11/25 |
| | | | 382/201 |
| 8,885,040 B2* | 11/2014 | Puah et al. .................... 348/126 |
| 8,922,780 B2* | 12/2014 | Mohazzab et al. ........... 356/477 |
| 2008/0205717 A1* | 8/2008 | Reeves ................ G06T 7/0012 |
| | | | 382/128 |
| 2009/0059241 A1* | 3/2009 | Lapa et al. ................... 356/603 |
| 2010/0046801 A1* | 2/2010 | Ishiyama ................ G01C 3/08 |
| | | | 382/106 |
| 2010/0302364 A1* | 12/2010 | Kim et al. .................... 348/136 |
| 2011/0228082 A1* | 9/2011 | Wen et al. .................... 348/139 |
| 2011/0298896 A1* | 12/2011 | Dillon et al. ................... 348/46 |
| 2011/0310229 A1* | 12/2011 | Ueda .............................. 348/46 |
| 2012/0105868 A1* | 5/2012 | Nomura et al. .............. 356/610 |
| 2012/0154576 A1* | 6/2012 | Weston et al. ............... 348/136 |
| 2012/0176478 A1* | 7/2012 | Wang et al. .................... 348/47 |
| 2012/0229628 A1* | 9/2012 | Ishiyama et al. ............ 348/135 |

FOREIGN PATENT DOCUMENTS

| | | |
|---|---|---|
| JP | 2005-092436 A | 4/2005 |
| JP | 2005-249432 A | 9/2005 |
| JP | 2007-271563 A | 10/2007 |
| JP | 2008-276743 A | 11/2008 |
| JP | 2011-128117 A | 6/2011 |
| JP | 2011-185872 A | 9/2011 |

* cited by examiner

THREE DIMENSIONAL MEASUREMENT APPARATUS, CONTROL METHOD THEREFOR, INFORMATION PROCESSING APPARATUS, CONTROL METHOD THEREFOR, AND NON-TRANSITORY COMPUTER-READABLE STORAGE MEDIUM

BACKGROUND OF THE INVENTION

Field of the Invention

The present invention relates to a three dimensional measurement apparatus, a control method therefor, an information processing apparatus, a control method therefor, and a non-transitory computer-readable storage medium.

Description of the Related Art

Conventionally, the light-section method which projects a plurality of slits is known to be used in a three dimensional measurement apparatus compatible with a dynamic scene. The light-section method which projects a plurality of slits generally projects slits all having the same shape. It is therefore difficult to uniquely associate captured slits with projected slits unless, for example, the measurement distance range is limited.

In a method described in Japanese Patent Laid-Open No. 2008-276743, not only a plurality of slits but also an image including at least one coded feature portion provided with at least one constituent element which fluctuates perpendicularly to a plane formed by at least one point on each of projection and visual axes is projected, and codes are extracted from the captured feature portion, thereby comparing the extracted codes with the codes on the projection side. Based on the comparison result, the captured slits are associated with the projected slits.

Unfortunately, in the configuration described in Japanese Patent Laid-Open No. 2008-276743, adjacent codes may overlap each other due to a blur generated by an optical system of an image capturing apparatus, and a blur generated by an optical system of a projection apparatus. Also, because features which fluctuate perpendicularly to a plane formed by at least one point on each of projection and visual axes are extracted, it may become impossible to identify specific codes when these features overlap each other, thus generating regions that cannot be measured. That is, the configuration described in Japanese Patent Laid-Open No. 2008-276743 may degrade the feature recognition performance.

SUMMARY OF THE INVENTION

The present invention has been made in consideration of the above-mentioned problem, and provides a technique of improving the feature recognition performance.

According to one aspect of the present invention, there is provided a three dimensional measurement apparatus comprising: a projection unit configured to project a pattern including a measurement pattern and a feature pattern onto an object; an image capturing unit configured to capture an image of the object onto which the pattern is projected; a grouping unit configured to divide the image captured by the image capturing unit into a plurality of regions using the measurement pattern in the pattern and a plurality of epipolar lines determined based on a positional relationship between the projection unit and the image capturing unit, and to group predetermined regions among the plurality of divided regions; a feature recognition unit configured to recognize the feature pattern based on a difference in the feature pattern between the predetermined regions; and a three-dimensional shape calculation unit configured to calculate a three-dimensional shape of the object based on the feature pattern recognized by the feature recognition unit.

According to one aspect of the present invention, there is provided an information processing apparatus comprising: a generation unit configured to group a plurality of regions formed based on a measurement pattern and a plurality of boundary lines which run in a direction different from a direction in which the measurement pattern extends, and arrange a feature pattern in at least one of the plurality of grouped regions, thereby generating a projection pattern including the measurement pattern and the feature pattern.

Further features of the present invention will become apparent from the following description of exemplary embodiments with reference to the attached drawings.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

(First Embodiment)

Figure 1:
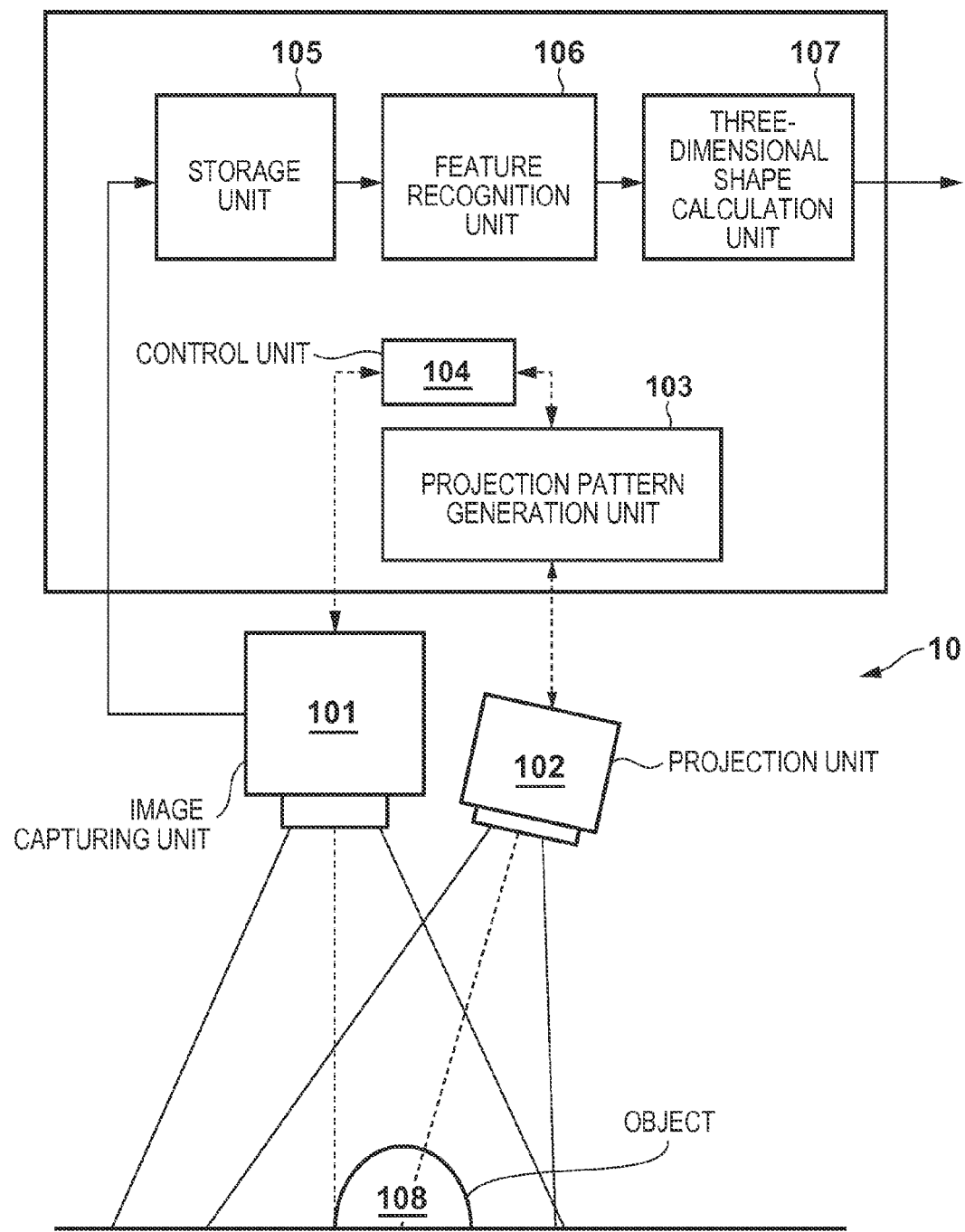
FIG. 1 is a block diagram showing the entire configuration of a three dimensional measurement apparatus.

The configuration of a three dimensional measurement apparatus 10 according to this embodiment will be described with reference to FIG. 1. The three dimensional measurement apparatus 10 according to this embodiment includes an image capturing unit 101, projection unit 102, projection pattern generation unit 103, control unit 104, storage unit 105, feature recognition unit 106, and three-dimensional shape calculation unit 107. The image capturing unit 101 includes an optical system and image sensor, and captures an image of an object 108. Also, the image capturing unit 101 outputs the captured image to the storage unit 105. Moreover, the image capturing unit 101 captures an image of the object 108 from a direction different from that in which the projection unit 102 projects a pattern.

The projection unit 102 is implemented by, for example, a laser projector or liquid crystal projector capable of projecting a pattern, and its configuration is not limited as long as it can project the pattern. Based on the information of a pattern input from the projection pattern generation unit 103, the projection unit 102 projects the pattern onto the object 108.

The projection pattern generation unit 103 generates a pattern to be projected onto the object 108 by the projection unit 102. The control unit 104 controls the projection timing of the pattern generated by the projection pattern generation unit 103. Also, the control unit 104 controls the image capturing unit 101 to start image capture, based on the timing at which the projection unit 102 starts to project a pattern.

The storage unit 105 is a memory which stores the captured image acquired from the image capturing unit 101. The storage unit 105 then outputs the captured image to the feature recognition unit 106.

The feature recognition unit 106 extracts measurement patterns and feature patterns from the captured image acquired from the storage unit 105 to recognize features. Based on the recognized features, the feature recognition unit 106 generates a code sequence and outputs it to the three-dimensional shape calculation unit 107.

The three-dimensional shape calculation unit 107 associates the positions of measurement patterns captured by the image capturing unit 101 with those of measurement patterns projected by the projection unit 102, based on the correspondence between the code sequence acquired from the feature recognition unit 106 and the original code sequence which forms the pattern. The three-dimensional shape calculation unit 107 then calculates a three-dimensional shape in accordance with the principle of triangulation, based on the positions of the associated measurement patterns.

An example of a pattern generated by the projection pattern generation unit 103 will be described first with reference to FIGS. 2A and 2B.

Figure 2A:
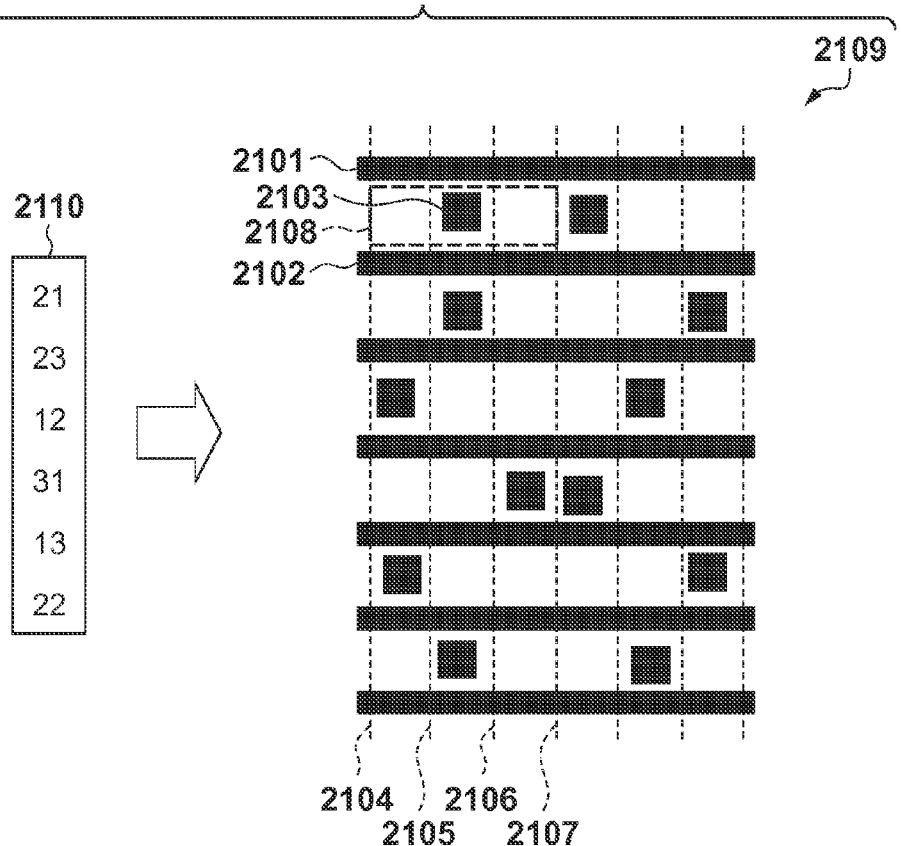
FIGS. 2A and 2B are views showing a projection pattern in a three dimensional measurement apparatus according to the first embodiment.

Referring to FIG. 2A, a pattern as exemplified by a pattern 2109 is generated by the projection pattern generation unit 103. The pattern 2109 is partially formed by measurement patterns 2101 and 2102 and feature patterns 2103. Note that the measurement patterns 2101 and 2102 shown in FIG. 2A are, for example, slit patterns. Also, the measurement patterns and feature patterns may be simultaneously projected onto the object 108 or independently projected onto the object 108 by sequentially switching them from one to the other. The pattern 2109 is a feature pattern generated based on a code sequence 2110. Note that the code sequence 2110 may be, for example, an m-sequence (Maximum length sequence) or a de Bruijn sequence. The m-sequence is one of pseudorandom number sequences known as maximum periodic sequences. Also, the de Bruijn sequence is a periodic code sequence with a characteristic feature that it includes positions which can be uniquely specified when a partial sequence having a length n is observed. Although a code sequence other than an m-sequence and de Bruijn sequence may be used as the code sequence 2110, it is desired that an arbitrarily selected partial sequence of the used sequence can be uniquely identified and differentiated from other partial sequences.

Feature patterns arranged to form the pattern 2109 will be described.

Referring again to FIG. 2A, epipolar lines 2104, 2105, 2106, and 2107 are lines at which an epipolar plane determined based on the positional relationship between the image capturing unit 101 and the projection unit 102 intersects with projection elements of the projection unit 102. Although the epipolar lines 2104, 2105, 2106, and 2107 are not indicated as actual lines which form the pattern 2109 in practice, they are indicated by dotted lines for the sake of convenience in describing feature patterns. Also, a group 2108 is a region indicated by a dotted frame and obtained by grouping three regions surrounded by the epipolar lines 2104, 2105, 2106, and 2107 and measurement patterns 2101 and 2102. A plurality of groups having the same shape as the group 2108 are arranged in the pattern 2109, and one corresponding code in the code sequence 2110 is assigned to one group.

The types of features assigned with specific codes in the group 2108 will be described with reference to FIG. 2B. Patterns 2201, 2205, and 2207 represent different types of features in the group 2108. Regions 2209, 2210, and 2211 surrounded by slits 2202 and 2203 and epipolar lines determined based on the positional relationship between the image capturing unit 101 and the projection unit 102 are defined for each of the patterns 2201, 2205, and 2207. A feature pattern 2204 is arranged within the region 2209 in the pattern 2201, a feature pattern 2206 is arranged within the region 2210 in the pattern 2205, and a feature pattern 2208 is arranged within the region 2211 in the pattern 2207. These three types of patterns 2201, 2205, and 2207 can be distinguished from each other based on the difference in ratio between the area of each of the regions 2209, 2210, and 2211 and that of a feature pattern within each of the regions 2209, 2210, and 2211, respectively.

In addition, the patterns 2201, 2205, and 2207 can be associated with numbers such as 1, 2, and 3 in accordance with regions where feature patterns are arranged.

Further, the projection pattern generation unit 103 need not always serve as part of the three dimensional measurement apparatus 10, and can be used independently as a projection pattern generation apparatus (information processing apparatus) which generates various types of projection patterns to be described in the present invention. When the projection pattern generation unit 103 is used as an independent projection pattern generation apparatus, a generated projection pattern need not always have regions divided by epipolar lines, and need only have regions divided by boundary lines which run in a direction different from that in which measurement patterns extend.

Figure 3:
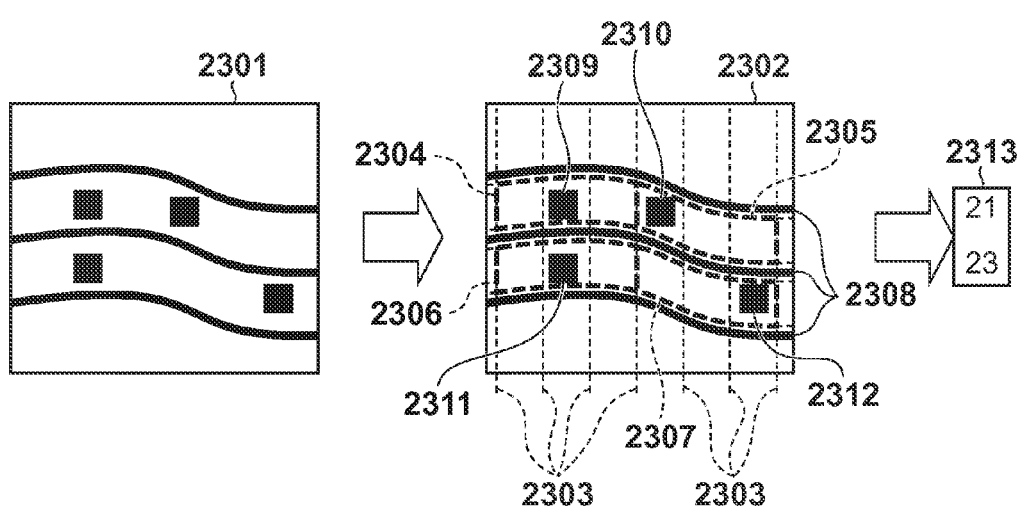
FIG. 3 is a view for explaining a recognition process by a feature recognition unit 106.

The feature recognition unit 106 will be described with reference to FIGS. 3 and 4A to 4D. Referring to FIG. 3, an image 2302 is obtained by extracting measurement patterns and feature patterns from an image 2301 acquired from the storage unit 105. The pattern is divided by a plurality of epipolar lines 2303 and a plurality of measurement patterns 2308 to define a plurality of regions. Among the plurality of divided regions, predetermined regions are grouped to define each of groups 2304, 2305, 2306, and 2307. That is, among the plurality of divided regions, a plurality of regions adjacent to each other in the direction in which measurement patterns extend are grouped as one group. Feature patterns 2309, 2310, 2311, and 2312 are arranged in the groups 2304, 2305, 2306, and 2307, respectively. A feature is recognized in each group based on the ratio between the area of each region in this group and that of a feature pattern within this region in this group to assign a code to this group. Although the feature recognition unit 106 may execute a region division process and a grouping process, another processing unit may be provided to execute these processes. In this case, the feature recognition unit 106 executes only a process of recognizing a feature in each group based on the ratio between the area of each region in this group and that of a feature pattern within this region in this group to assign a code to this group.

A method of recognizing features will be described in detail herein with reference to FIGS. 4A to 4D. First, referring to FIG. 4A, a pattern 2401 is formed by measurement patterns 2402 and 2403 and feature patterns 2406 and 2407. Also, regions 2408, 2409, 2410, 2411, 2412, and 2413 divided by the measurement patterns 2402 and 2403 and epipolar lines can be defined. In addition, the regions 2408, 2409, and 2410 are grouped to define a group 2404. Similarly, the regions 2411, 2412, and 2413 are grouped to define a group 2405.

A method of recognizing a feature in the group 2404 will be described first. The areas of the regions 2408, 2409, and 2410 which form the group 2404 are obtained. Then, the areas of the feature pattern 2406 within the regions 2408, 2409, and 2410 are obtained. The ratios between the areas of the regions 2408, 2409, and 2410 and those of the feature pattern 2406 within the regions 2408, 2409, and 2410, respectively, are obtained, so a feature pattern can be recognized to be present within a region where the area occupied by the feature pattern 2406 is larger than those in the remaining regions. Similarly, a feature is recognized to be present within the region 2411 in the group 2405.

A method of recognizing a pattern using the ratio between the area of each region and that of a feature pattern within this region will be described herein using actual area values. In the group 2404 of the pattern 2401, the area of the feature pattern 2406 is assumed to be 2, and the areas of the regions 2408, 2409, and 2410 are assumed to be all 4. The areas of the feature pattern 2406 within the regions 2408, 2409, and 2410 are divided by those of the regions 2408, 2409, and 2410, respectively. As a result, the ratio between the area of each region and that of a feature pattern within this region is 0 (0/4) in the regions 2408 and 2409, and 1/2 (2/4) in the region 2410. As can be seen from a comparison between the area ratios of the respective regions, the region 2410 has a maximum area ratio. Accordingly, the feature pattern 2406 can be estimated to be present within the region 2410. Note that the recognition performance of a feature pattern improves by increasing the difference in area ratio between the regions. Hence, a feature pattern generated by the projection pattern generation unit 103 desirably extends parallel to or almost parallel to the direction in which epipolar lines run to increase the difference in area ratio between the regions, thereby improving the recognition performance.

Figure 4A:
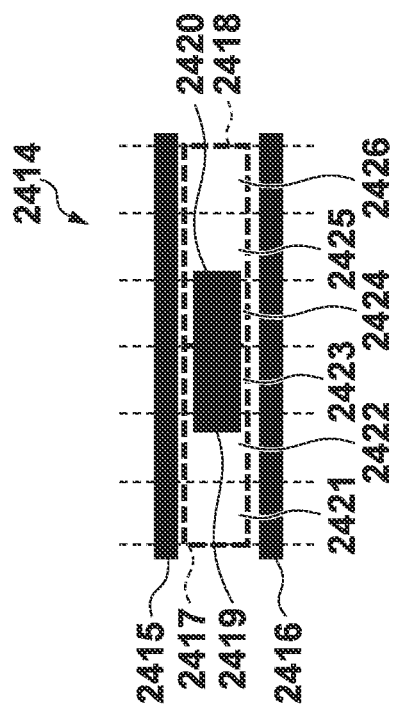
FIGS. 4A to 4D are views for explaining the recognition process by the feature recognition unit 106.
Figure 4B:
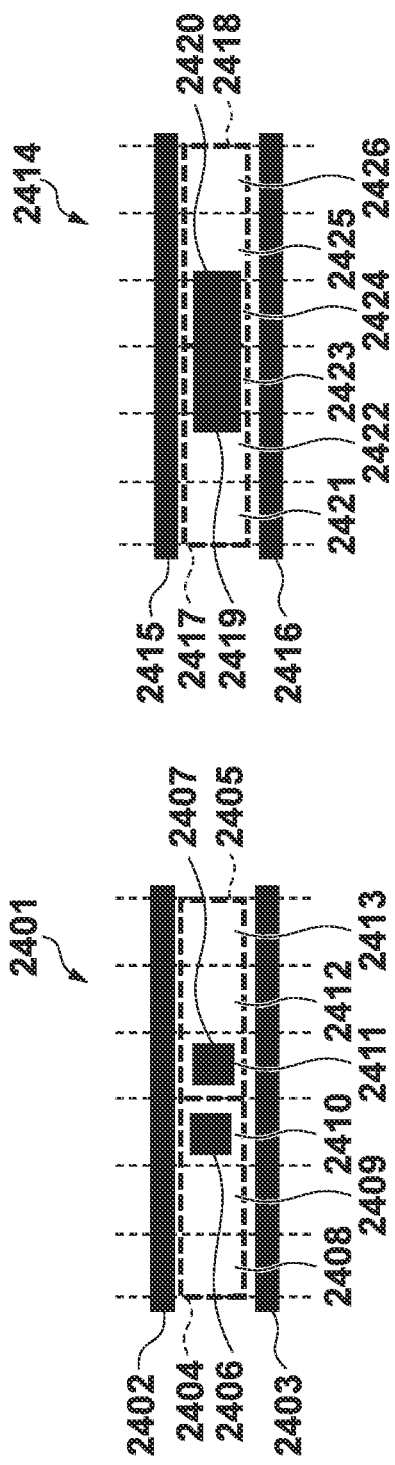

The case wherein feature patterns overlap each other due to the influence of a blur generated by the optical system of the image capturing unit 101 and the influence of a blur generated by the optical system of the projection unit 102 will be described with reference to FIG. 4B. A pattern 2414 is formed by measurement patterns 2415 and 2416 and feature patterns 2419 and 2420. The feature patterns 2419 and 2420 overlap each other due to the influence of a blur. Also, regions 2421, 2422, 2423, 2424, 2425, and 2426 divided by the measurement patterns 2415 and 2416 and epipolar lines can be defined. In addition, the regions 2421, 2422, and 2423 are grouped together to define a group 2417. Similarly, the regions 2424, 2425, and 2426 are grouped together to define a group 2418.

A method of recognizing a feature in the group 2417 will be described first. The areas of the regions 2421, 2422, and 2423 which form the group 2417 are obtained. Then, the areas of the feature pattern 2419 within the regions 2421, 2422, and 2423 are obtained. The ratios between the areas of the regions 2421, 2422, and 2423 and those of the feature pattern 2419 within the regions 2421, 2422, and 2423, respectively, are obtained, so a feature pattern is recognized to be present within a region where the area occupied by the feature pattern 2419 is larger than those in the remaining regions. This means that a feature pattern is recognized to be present within the region 2423 in the group 2417. Note that even if the feature pattern 2419 accounts for only a small part of the region 2422 due to a blur, the area occupied by the feature pattern 2419 is smaller in the region 2422 than in any of the remaining areas, so a feature can be accurately recognized in the group 2417. Similarly, a feature pattern is recognized to be present within the region 2424 in the group 2418. In this manner, the three dimensional measurement apparatus according to this embodiment increases the probability that features can be recognized even if feature patterns overlap each other due to the influence of a blur generated by the optical system of the image capturing unit 101 and the influence of a blur generated by the optical system of the projection unit 102.

Figure 4D:
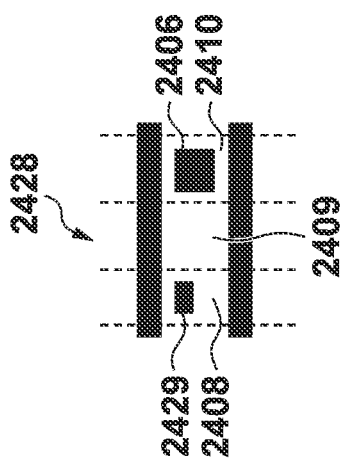
Figure 4C:
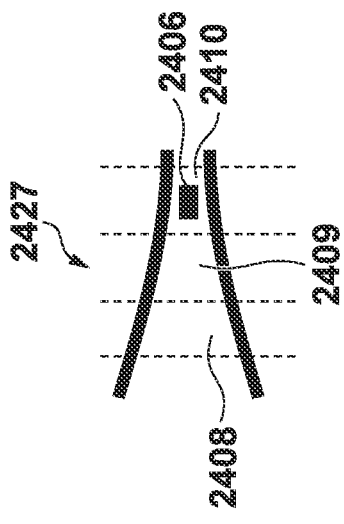

Feature recognition which uses the ratio between the area of each region and that of a feature pattern within this region will be described with reference to FIGS. 4C and 4D. The use of the ratio between the area of each region and that of a feature pattern within this region allows feature recognition even for a pattern 2427 as shown in FIG. 4C and a pattern 2428 as shown in FIG. 4D. As in the pattern 2427, even if the area of the feature pattern 2406 reduces due to factors associated with the shape of the object 108, the area of the region 2410, in turn, reduces depending on the geometrical relationship between the image capturing unit 101 and the projection unit 102. Hence, the ratio between the area of the region 2410 and that of the feature pattern 2406 in the group 2404 of the pattern 2401 is almost the same in the patterns 2401 and 2427, so a region where a feature pattern is arranged can be recognized even in the pattern 2427. As a matter of course, as long as the object 108 has a shape close to a plane to a certain degree, a region where a feature pattern is present may be recognized by comparing the areas of the feature pattern itself, instead of the ratios between the areas of respective regions and those of a feature pattern within these regions. Assume also that noise 2429 produced upon image capture is added in the pattern 2428. Even in this case, a region where a feature pattern is arranged can be recognized as the region 2410 because the ratio between the area of each region and that of a feature pattern within this region maximizes in the region 2410.

Referring back to FIG. 3, the feature recognition unit 106 generates a code sequence 2313 as a result of recognizing a feature for each of the groups 2304, 2305, 2306, and 2307. In an example shown in FIG. 3, the code is 2 in the group 2304, 1 in the group 2305, 2 in the group 2306, and 3 in the group 2307. The feature recognition unit 106 outputs the generated code sequence 2313 to the three-dimensional shape calculation unit 107.

Figure 5:
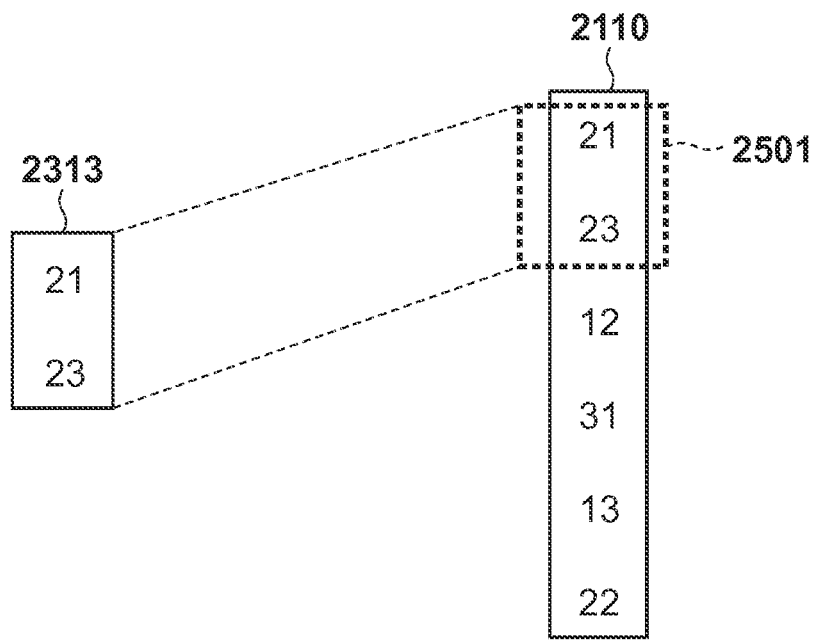
FIG. 5 is a view for explaining the recognition process by the feature recognition unit 106.

The three-dimensional shape calculation unit 107 will be described with reference to FIG. 5. The three-dimensional shape calculation unit 107 acquires the code sequence 2313 from the feature recognition unit 106. The three-dimensional shape calculation unit 107 searches for the correspondence between the code sequence 2313 and the original code sequence 2110 which forms the pattern 2109 shown in FIG. 2A, thereby deriving a corresponding position 2501 enclosed in a dotted frame in FIG. 5. The three-dimensional shape calculation unit 107 associates the positions of measurement patterns captured by the image capturing unit 101 with those of measurement patterns projected by the projection unit 102, based on the correspondence between those two code sequences. The three-dimensional shape calculation unit 107 calculates the three-dimensional shape of the object 108 in accordance with the principle of triangulation, based on the positions of the associated measurement patterns, as described above. Note that details of the basic principle of triangulation are disclosed in Japanese Patent Laid-Open No. 2008-276743.

Figure 6:
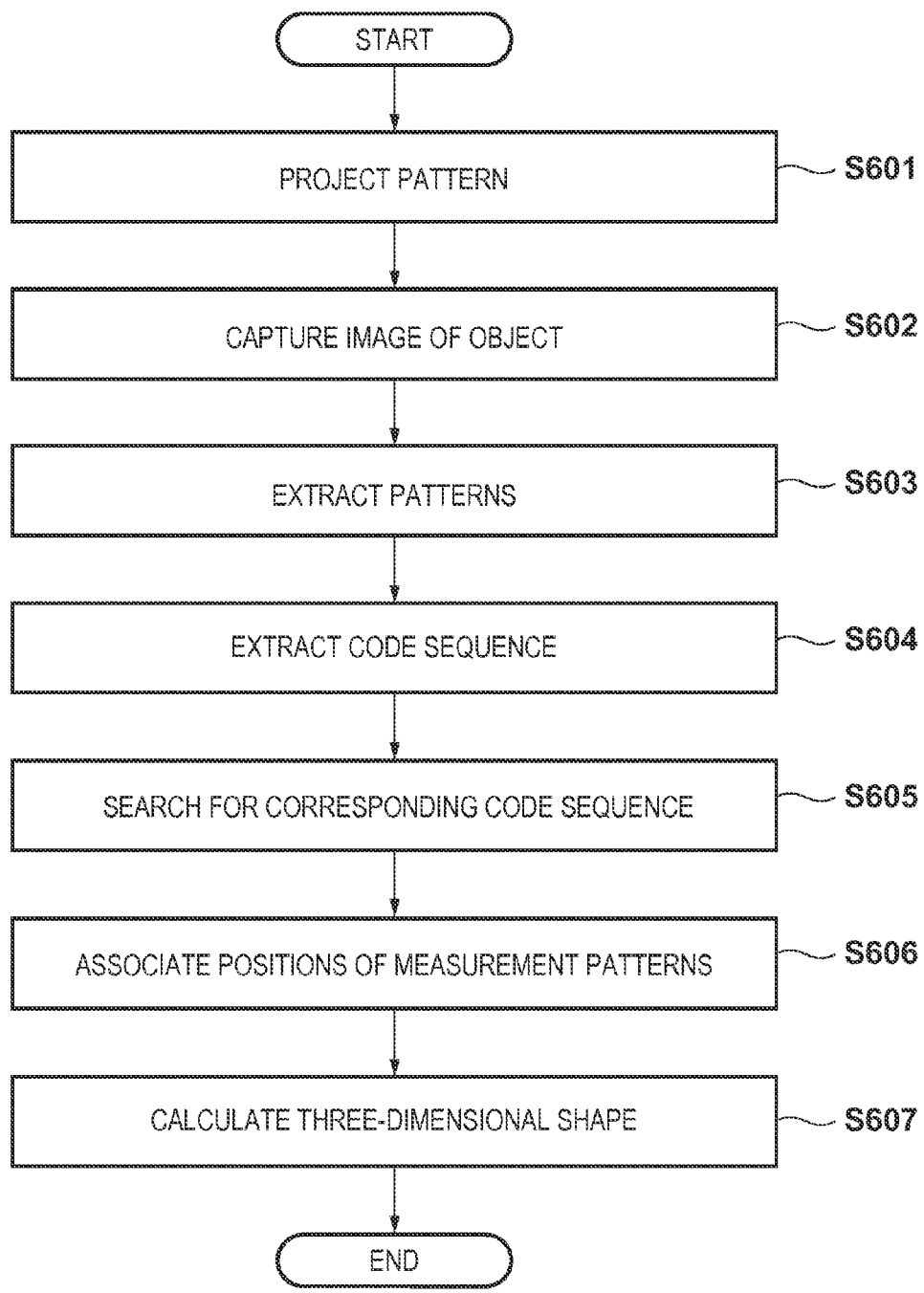
FIG. 6 is a flowchart showing the procedure of a process by the three dimensional measurement apparatus.

The procedure of a process by the three dimensional measurement apparatus according to this embodiment will be described with reference to a flowchart shown in FIG. 6.

In step S601, the projection unit 102 projects, onto the object 108, a pattern generated by the projection pattern generation unit 103 based on a signal which serves to output a pattern and is sent from the control unit 104 to the projection pattern generation unit 103. In step S602, the image capturing unit 101 captures an image of the object 108 based on an image capture signal sent from the control unit 104 to the image capturing unit 101 at the timing at which projection starts. Also, the image capturing unit 101 stores the captured image in the storage unit 105.

In step S603, the feature recognition unit 106 extracts measurement patterns and feature patterns from the captured image acquired from the storage unit 105. In step S604, the feature recognition unit 106 extracts a code sequence from the measurement patterns and feature patterns extracted in step S603, and outputs it to the three-dimensional shape calculation unit 107.

In step S605, the three-dimensional shape calculation unit 107 searches for a code sequence corresponding to the extracted code sequence. In step S606, the three-dimensional shape calculation unit 107 associates the positions of measurement patterns captured by the image capturing unit 101 with those of measurement patterns projected by the projection unit 102.

In step S607, the three-dimensional shape calculation unit 107 calculates the three-dimensional shape of the object 108 in accordance with the principle of triangulation, based on the positions of the associated measurement patterns, and the positional relationship between the image capturing unit 101 and projection unit 102. Upon the above-mentioned operation, each process in the flowchart shown in FIG. 6 ends.

According to this embodiment, it is possible to increase the probability that features can be recognized even if feature patterns overlap each other due to the influence of a blur generated by the optical system of the image capturing unit and the influence of a blur generated by the optical system of the projection unit.

(Second Embodiment)

A three dimensional measurement apparatus according to this embodiment has the same configuration as the three dimensional measurement apparatus 10 described in the first embodiment, and a description thereof will not be given. How to define groups for patterns generated by a projection pattern generation unit 103 according to this embodiment, using methods different from the method of defining the group 2108 for the pattern 2109 shown in FIG. 2A, will be described with reference to FIGS. 7A, 7B, 8A, 8B, 9A, and 9B.

Figure 7A:
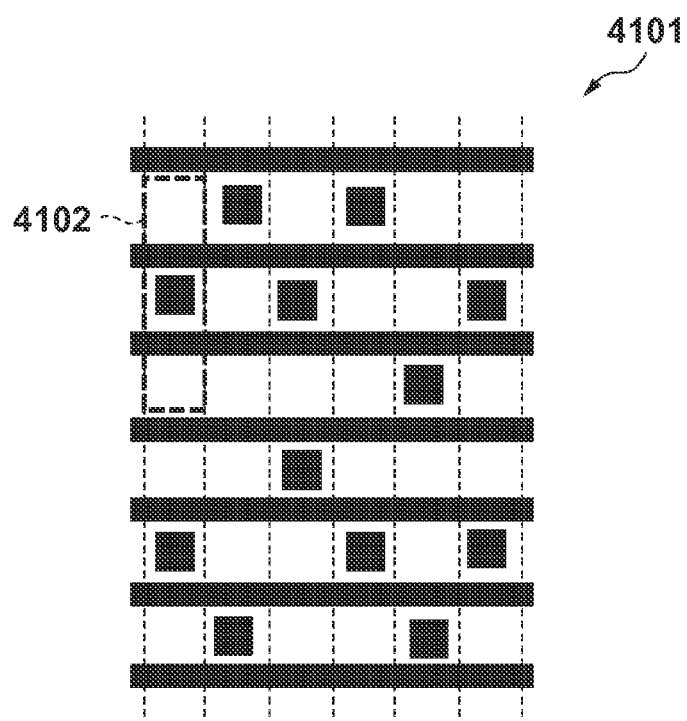
FIGS. 7A and 7B are views showing a projection pattern in a three dimensional measurement apparatus according to the second embodiment.

First, for a pattern 4101 shown in FIG. 7A, predetermined regions are defined as a group perpendicular to the direction in which measurement patterns extend, as exemplified by a group 4102. That is, among a plurality of regions, a plurality of regions adjacent to each other in the direction in which epipolar lines run are grouped as one group.

Figure 7B:
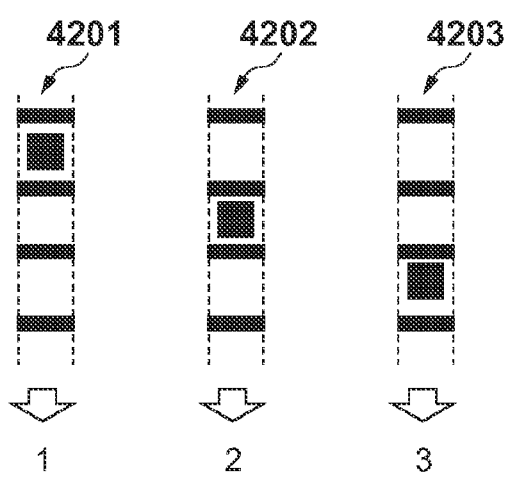

This makes it possible to recognize different features formed in patterns 4201, 4202, and 4203 shown in FIG. 7B in the group 4102. The patterns 4201, 4202, and 4203 can be associated with numbers such as 1, 2, and 3 in accordance with regions where feature patterns are arranged. In this case, the pattern 4201 is associated with 1, the pattern 4202 is associated with 2, and the pattern 4203 is associated with 3.

Figure 8A:
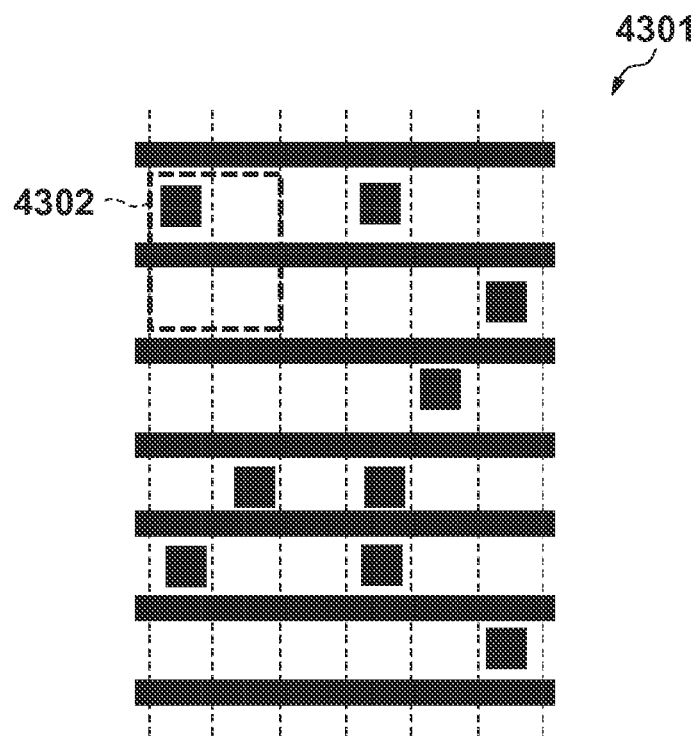
FIGS. 8A and 8B are views showing another projection pattern in the three dimensional measurement apparatus according to the second embodiment.
Figure 8B:
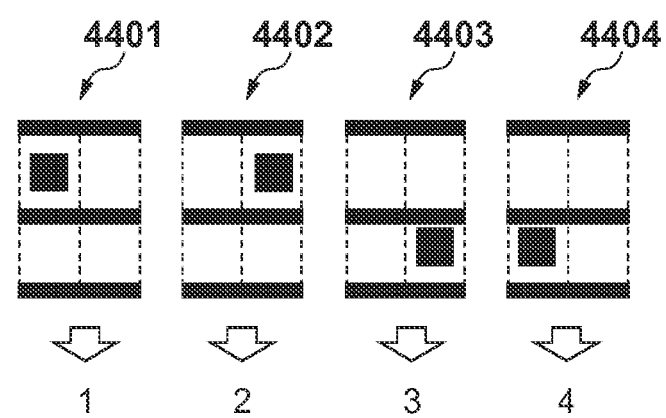

Next, for a pattern 4301 shown in FIG. 8A, predetermined regions are defined as a group parallel to and perpendicular to the direction in which measurement patterns extend, as exemplified by a group 4302. That is, among a plurality of regions, a plurality of regions adjacent to each other in the direction in which measurement patterns extend and that in which epipolar lines run are grouped as a rectangular region. This makes it possible to recognize different features formed in patterns 4401, 4402, 4403, and 4404 shown in FIG. 8B in the group 4302. The patterns 4401, 4402, 4403, and 4404 can be associated with numbers such as 1, 2, 3, and 4 in accordance with regions where feature patterns are arranged. In this case, the pattern 4401 is associated with 1, the pattern 4402 is associated with 2, the pattern 4403 is associated with 3, and the pattern 4404 is associated with 4.

Figure 9A:
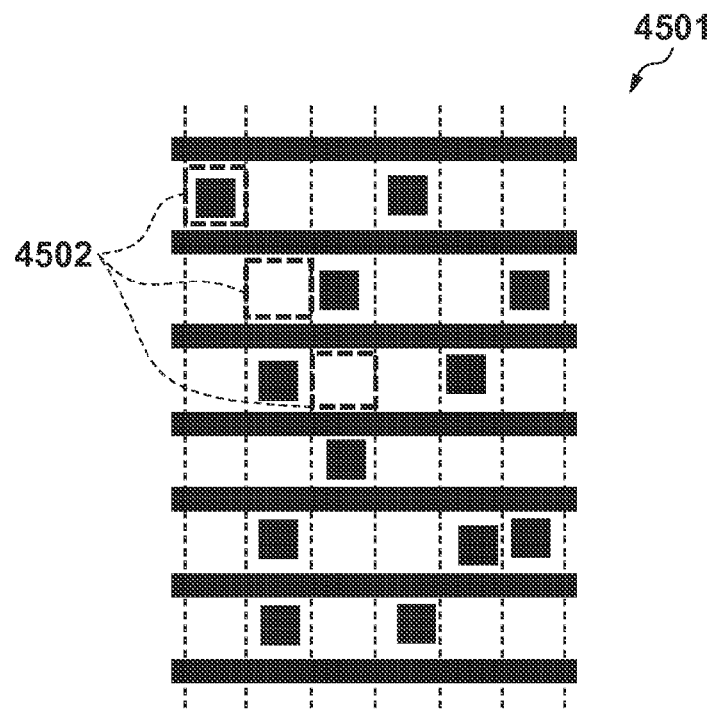
FIGS. 9A and 9B are views showing still another projection pattern in the three dimensional measurement apparatus according to the second embodiment.
Figure 9B:
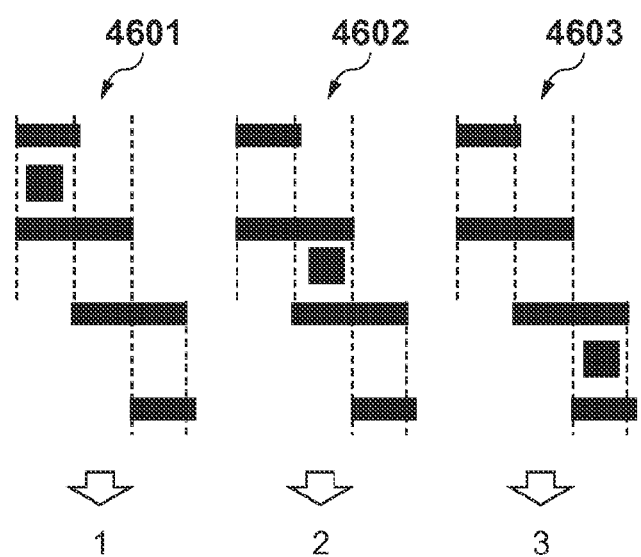

For a pattern 4501 shown in FIG. 9A, predetermined regions are defined as a group oblique to the direction in which measurement patterns extend, as exemplified by a group 4502. That is, among a plurality of regions, a plurality of obliquely aligned regions which are adjacent to each other neither in the direction in which measurement patterns extend nor that in which epipolar lines run are grouped. Note that the direction in which grouped regions are aligned is not limited to either the 45° or 135° direction as long as these regions are obliquely aligned. When a coordinate system is defined for the 45° direction, a plurality of regions shifted from each other by one block in the X-direction and one block in the Y-direction ((1, 1)-direction) are typically defined as a group, a plurality of regions shifted from each other by, for example, two blocks in the X-direction and one block in the Y-direction ((2, 1)-direction) may be defined as a group. This makes it possible to recognize different features formed in patterns 4601, 4602, and 4603 shown in FIG. 9B in the group 4502. The patterns 4601, 4602, and 4603 can be associated with numbers such as 1, 2, and 3 in accordance with regions where feature patterns are arranged. In this case, the pattern 4601 is associated with 1, the pattern 4602 is associated with 2, and the pattern 4603 is associated with 3.

Figure 2B:
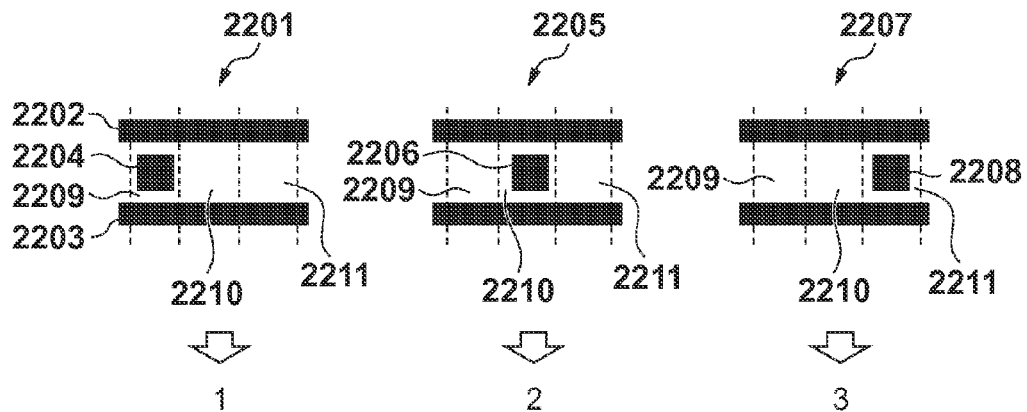

Also, the adjacent regions 2209, 2210, and 2211 in FIG. 2B need not always be adjacent to each other, and non-grouped regions may be inserted between the regions 2209 and 2210 and between the regions 2210 and 2211. When non-grouped regions are inserted between grouped regions, the interval between the grouped regions may be determined based on the area of a continuous surface of an object 108. Note that as in the image 2301 shown in FIG. 3, if a pattern to be projected often deforms due to factors associated with the object shape, and the area of the continuous surface is therefore smaller than that of the pattern to be projected, narrowing the interval between grouped regions makes it possible to increase the probability that the grouped regions can be recognized to be included in the same group.

Also, when non-grouped regions are inserted between grouped regions, the interval between the grouped regions may be determined based on the shape of the object 108. If the object 108 has a highly uneven shape, narrowing the interval between grouped regions makes it possible to increase the probability that the grouped regions can be recognized to be included in the same group.

Moreover, when non-grouped regions are inserted between grouped regions, the interval between the grouped regions may be determined based on the resolution of the image capturing unit. If the resolution of the image capturing unit is lower than the interval at which feature patterns are arranged in a pattern, widening the interval between grouped regions makes it possible to increase the probability that the grouped regions can be recognized to be included in the same group.

In this manner, by defining several regions that are closeby as the same group, specific codes can be efficiently extracted even if the object 108 has a surface portion with a less continuous shape. The three-dimensional shape of the object 108 can be calculated using the pattern described in this embodiment, as in the first embodiment.

According to this embodiment, it is possible to increase the probability that features can be recognized even if feature patterns overlap each other due to the influence of a blur generated by the optical system of the image capturing unit and the influence of a blur generated by the optical system of the projection unit.

(Third Embodiment)

A three dimensional measurement apparatus according to this embodiment has the same configuration as the three dimensional measurement apparatus 10 described in the first embodiment, and a description thereof will not be given. Feature patterns for patterns generated by a projection pattern generation unit 103 according to this embodiment, which are different from the feature pattern 2103 for the pattern 2109 shown in FIG. 2A, will be described with reference to FIGS. 10 to 14.

Figure 10:
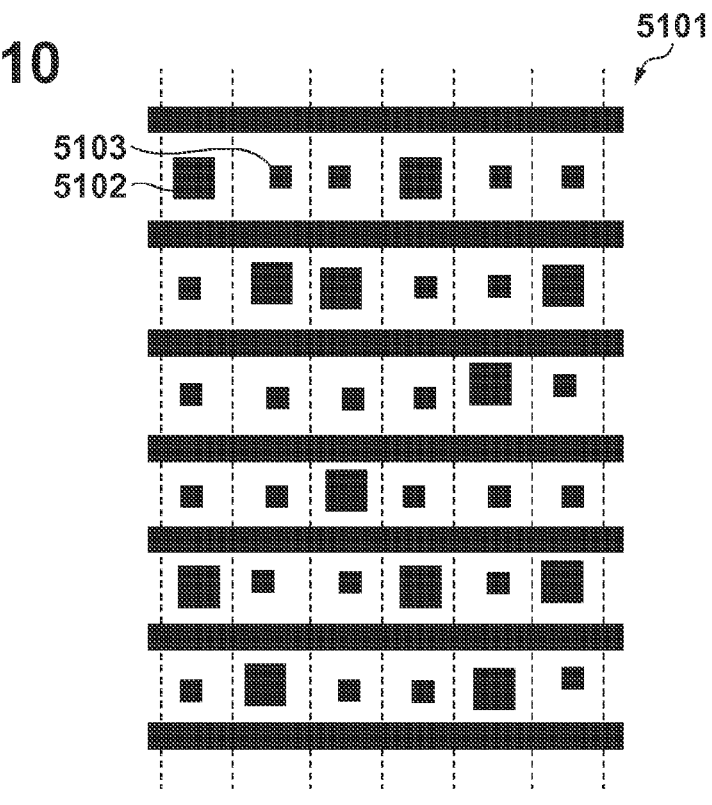
FIG. 10 is a view showing a projection pattern in a three dimensional measurement apparatus according to the third embodiment.

As exemplified by a pattern 5101 shown in FIG. 10, a pattern generated by the projection pattern generation unit 103 may be formed using feature patterns 5102 and 5103 having different areas. Alternatively, the difference in feature pattern may be the difference in dimension, in a direction parallel to that in which epipolar lines run, of the feature pattern arranged in each of a plurality of grouped regions. In an example shown in FIG. 10, the feature patterns 5102 and 5103 have different dimensions in a direction parallel to that in which epipolar lines run. That is, features can be recognized based on the difference in area of the feature pattern or in dimension of the feature pattern in a direction parallel to that in which epipolar lines run.

Figure 11:
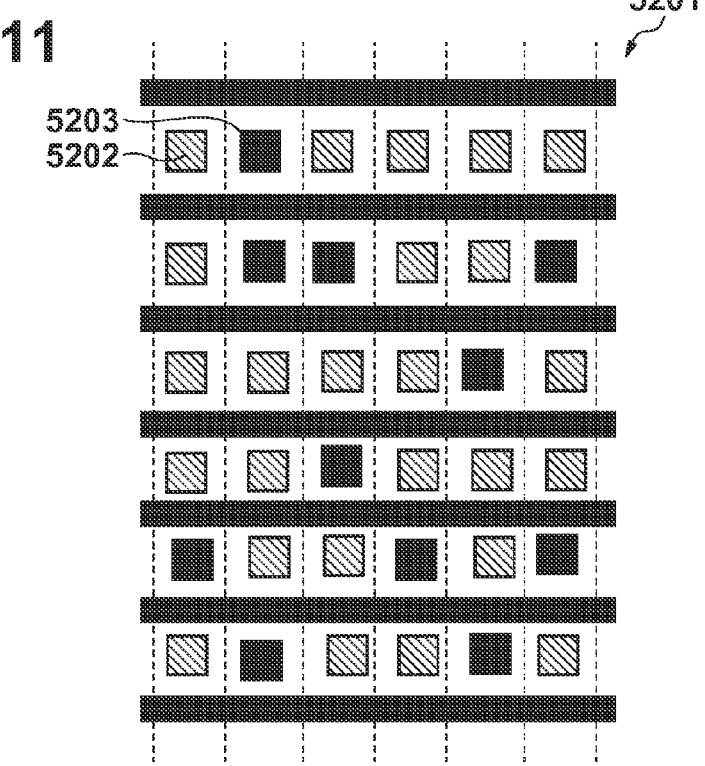
FIG. 11 is a view showing another projection pattern in the three dimensional measurement apparatus according to the third embodiment.

Also, as exemplified by a pattern 5201 shown in FIG. 11, a pattern generated by the projection pattern generation unit 103 may be formed using feature patterns 5202 and 5203 having different light wavelengths or light luminances. That is, features can be recognized based on the difference in light wavelength or light luminance.

Figure 12:
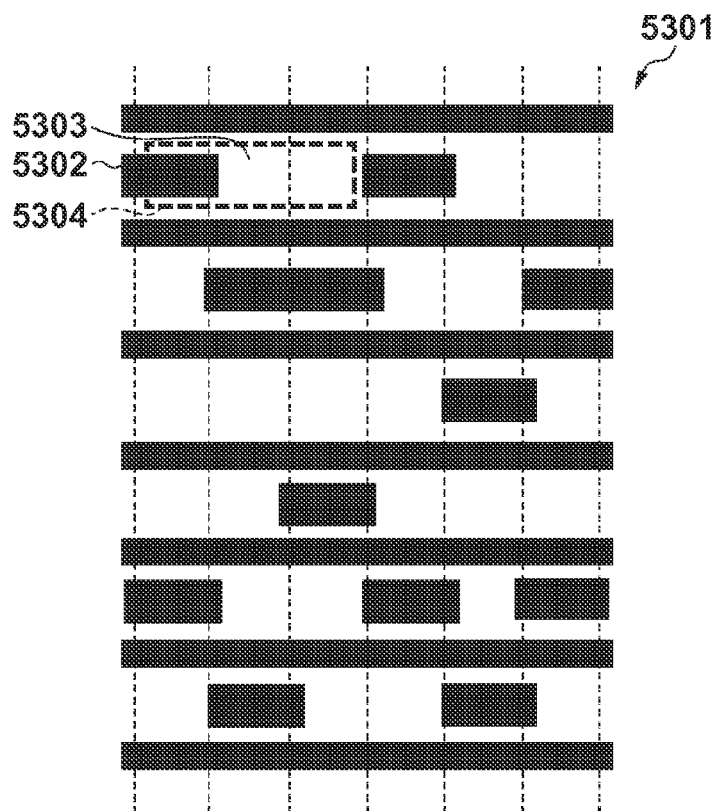
FIG. 12 is a view showing still another projection pattern in the three dimensional measurement apparatus according to the third embodiment.

Moreover, as exemplified by a pattern 5301 shown in FIG. 12, a pattern generated by the projection pattern generation unit 103 may be formed using a feature pattern 5302 overlapping an adjacent region 5303. The feature recognition unit 106 can recognize features even if feature patterns overlap each other, as long as a defined group 5304 includes regions with a difference in feature.

Figure 13:
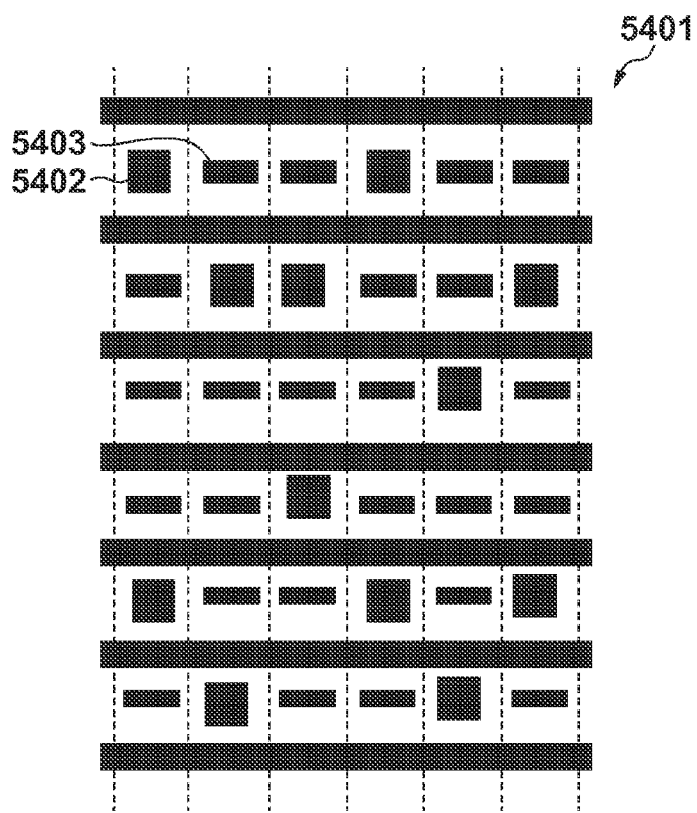
FIG. 13 is a view showing still another projection pattern in the three dimensional measurement apparatus according to the third embodiment.

Again, as exemplified by a pattern 5401 shown in FIG. 13, a pattern generated by the projection pattern generation unit 103 may be formed using feature patterns 5402 and 5403 having features different in a direction parallel to that in which epipolar lines run. In the case of FIG. 13, the pattern 5402 has an area larger than that of the feature pattern 5403.

Figure 14:
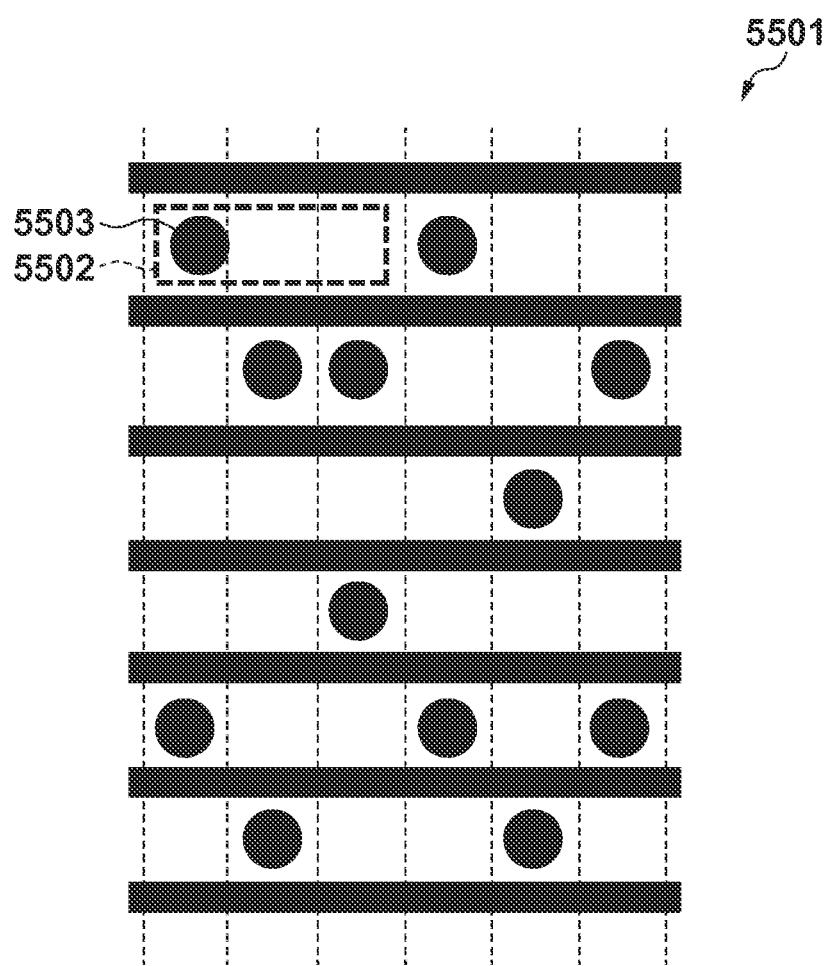
FIG. 14 is a view showing still another projection pattern in the three dimensional measurement apparatus according to the third embodiment.

Again, as exemplified by a pattern 5501 shown in FIG. 14, a pattern generated by the projection pattern generation unit 103 is formed using a feature pattern, as exemplified by a feature pattern 5503, obtained by deforming the feature pattern 2103 of the group 2108 shown in FIG. 2A into a circular shape. The feature pattern 5503 has a feature area different in a group 5502. Hence, features can be recognized even if they have different shapes, so a pattern generated using the projection pattern generation unit 103 may be formed using the feature pattern 5503.

The three-dimensional shape of the object 108 can be calculated using the pattern described in this embodiment, as in the first embodiment.

According to this embodiment, it is possible to increase the probability that features can be recognized even if feature patterns overlap each other due to the influence of a blur generated by the optical system of the image capturing unit and the influence of a blur generated by the optical system of the projection unit.

According to the present invention, it is possible to further improve the feature recognition performance.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-228272 filed on Oct. 17, 2011, which is hereby incorporated by reference herein in its entirety.

What is claimed is:

1. A three dimensional measurement apparatus comprising:
  an image obtaining unit configured to obtain an image obtained by capturing an object onto which a pattern including a measurement pattern and a feature pattern is projected, the feature pattern being generated based on a first code sequence which is a periodic code sequence including positions which can be uniquely specified when a partial sequence is observed;
  a grouping unit configured to divide the image obtained by the image obtaining unit into a plurality of regions by regions formed by using the measurement pattern in the pattern and a plurality of epipolar lines determined based on a positional relationship between a projection unit that projects the pattern and an image capturing unit that captures the object, and to group predetermined regions among the plurality of divided regions;

a feature recognition unit configured to recognize the feature pattern by estimating the region in which the feature pattern exists among the grouped plurality of regions, by comparing ratios between each area of the grouped plurality of regions and each area of the feature pattern in each of the grouped plurality of regions, such that the feature pattern can be recognized in a case where one or more feature patterns overlap each other, or in a case where the feature pattern does not exist precisely in one region;

a code sequence generation unit configured to generate a second code sequence based on a recognition result of the feature pattern for each group by the feature recognition unit;

an association unit configured to associate the second code sequence generated by the code sequence generation unit with the first code sequence used for generation within the feature pattern; and a three-dimensional shape calculation unit configured to calculate a three-dimensional shape of the object based on an association result of the association unit.

2. The apparatus according to claim 1, wherein said grouping unit is configured to group a plurality of regions, adjacent to each other in a direction in which the measurement pattern extends, among the plurality of regions.

3. The apparatus according to claim 1, wherein said grouping unit is configured to group a plurality of regions, adjacent to each other in a direction in which the epipolar lines run, among the plurality of regions.

4. The apparatus according to claim 1, wherein said grouping unit is configured to group, as a rectangular region, a plurality of regions, adjacent to each other in a direction in which the measurement pattern extends and a direction in which the epipolar lines run, among the plurality of regions.

5. The apparatus according to claim 1, wherein said grouping unit is configured to group a plurality of regions, which are adjacent to each other neither in a direction in which the measurement pattern extends nor in a direction in which the epipolar line extends, among the plurality of regions.

6. The apparatus according to claim 1, wherein said grouping unit is further configured to determine an interval between the grouped regions based on an area of a continuous surface of the object.

7. The apparatus according to claim 1, wherein said grouping unit is further configured to determine an interval between the grouped regions based on a shape of the object.

8. The apparatus according to claim 1, wherein said grouping unit is further configured to determine an interval between the grouped regions based on a resolution of said image capturing unit.

9. The apparatus according to claim 1, wherein said projection unit is configured to simultaneously project the measurement pattern and the feature pattern onto the object as the pattern.

10. The apparatus according to claim 1, wherein said projection unit is configured to project the measurement pattern and the feature pattern onto the object as the pattern by sequentially switching the measurement pattern and the feature pattern from one to the other.

11. The apparatus according to claim 1, wherein the measurement pattern includes a slit pattern.

12. A control method for a three dimensional measurement apparatus, including:

obtaining an image of an object comprising a pattern including a measurement pattern and a feature pattern projected by a projection unit, the image being captured by an image capturing unit for capturing the image of the object onto which the pattern is projected the feature pattern being generated based on a first code sequence which is a periodic code sequence including positions which can be uniquely specified when a partial sequence is observed;

dividing the image obtained by the image obtaining unit into a plurality of regions by regions formed by using the measurement pattern in the pattern and a plurality of epipolar lines determined based on a positional relationship between the projection unit and the image capturing unit, and grouping predetermined regions among the plurality of divided regions;

recognizing the feature pattern by estimating the region in which the feature pattern exists among the grouped plurality of regions, by comparing ratios between each area of the grouped plurality of regions and each area of the feature pattern in each of the grouped plurality of regions, such that the feature pattern can be recognized in a case where one or more feature patterns overlap each other, or in a case where the feature pattern does not exist precisely in one region;

generating a second code sequence based on a recognition result of the feature pattern for each group by the recognition;

associating the second code sequence generated by the code sequence generation with the first code sequence used for generation within the feature pattern; and calculating a three-dimensional shape of the object based on an association result.

13. A non-transitory computer-readable storage medium storing a computer program, which when run on a computer in a three dimensional measurement apparatus, cause the apparatus to perform steps of:

obtaining an image of an object comprising a pattern including a measurement pattern and a feature pattern projected by a projection unit, the image being captured by an image capturing unit for capturing the image of the object onto which the pattern is projected the feature pattern being generated based on a first code sequence which is a periodic code sequence including positions which can be uniquely specified when a partial sequence is observed;

dividing the image obtained by the image obtaining unit into a plurality of regions by regions formed by using the measurement pattern in the pattern and a plurality of epipolar lines determined based on a positional relationship between the projection unit and the image capturing unit, and grouping predetermined regions among the plurality of divided regions;

recognizing the feature pattern by estimating the region in which the feature pattern exists among the grouped plurality of regions, by comparing ratios between each area of the grouped plurality of regions and each area of the feature pattern in each of the grouped plurality of regions, such that the feature pattern can be recognized in a case where one or more feature patterns overlap each other, or in a case where the feature pattern does not exist precisely in one region;

generating a second code sequence based on a recognition result of the feature pattern for each group by the recognition;

associating the second code sequence generated by the code sequence generation with the first code sequence used for generation within the feature pattern; and calculating a three-dimensional shape of the object based on an association result.

14. The apparatus according to claim 1, wherein said feature recognition unit is configured to recognize a code of the feature pattern based on pixel values in each of the grouped predetermined regions.

15. The apparatus according to claim 1, further comprising said projection unit and said image capturing unit.

* * * * *